(12) United States Patent
Blomquist et al.

(10) Patent No.: US 7,267,139 B2
(45) Date of Patent: Sep. 11, 2007

(54) VALVE DEVICE

(75) Inventors: Micael Blomquist, Kvissleby (SE); Stefan Bergström, Sundsvall (SE); Urban Ericson, Njurunda (SE); Magnus Thorsell, Sundsvall (SE)

(73) Assignee: STT Emtec AB, Sundsvall (SE)

( * ) Notice: Subject to any disclaimer, the term of this patent is extended or adjusted under 35 U.S.C. 154(b) by 86 days.

(21) Appl. No.: 11/091,655

(22) Filed: Mar. 28, 2005

(65) Prior Publication Data

US 2005/0241702 A1   Nov. 3, 2005

(30) Foreign Application Priority Data

Mar. 26, 2004  (SE) .................................. 0400788

(51) Int. Cl.
*F16K 11/072* (2006.01)
(52) U.S. Cl. ............... 137/607; 137/637.3; 123/568.24
(58) Field of Classification Search ............... 137/606, 137/607, 630.12, 637.3; 251/263; 123/568.18, 123/568.24, 568.26
See application file for complete search history.

(56) References Cited

U.S. PATENT DOCUMENTS

| 2,113,925 | A | * | 4/1938 | Peerstone .............. 137/630.21 |
| 4,020,809 | A | * | 5/1977 | Kern et al. ............ 123/568.24 |
| 4,924,840 | A |   | 5/1990 | Wade |
| 5,205,265 | A |   | 4/1993 | Kashiyama et al. |
| 5,427,141 | A |   | 6/1995 | Ohtsubo |
| 5,647,399 | A | * | 7/1997 | Andersen ................. 137/637.3 |
| 6,135,415 | A | * | 10/2000 | Kloda et al. ........... 251/129.11 |
| 6,484,755 | B1 | * | 11/2002 | Schwarz .................. 137/637.3 |
| 6,568,417 | B2 | * | 5/2003 | Laney ..................... 137/15.25 |
| 7,032,877 | B2 | * | 4/2006 | von Willich ................. 251/78 |

FOREIGN PATENT DOCUMENTS

| DE | 3237337 | 4/1983 |
| WO | WO00/28203 | 5/2000 |

* cited by examiner

*Primary Examiner*—John Fox
(74) *Attorney, Agent, or Firm*—Dilworth & Barrese LLP

(57) ABSTRACT

The invention relates to a valve device comprising a valve housing (2) with a first and a second flow channel (3a, 3b), and a first and second damper shaft (8a, 8b), which are rotatable relative to the valve housing (2). A first damper (7a) is arranged in the first flow channel (3a) fixed to the first damper shaft (8a) and a second damper (7b) is arranged in the second flow channel (3b) fixed to the second damper shaft (8b). A rotatable regulating member (13) is arranged to control the rotational position of the damper shafts (8a, 8b) via two motion transfer members (20a, 20b), the respective motion transfer member (20a, 20b) being in engagement with a guiding (21) of the regulating member (13) so that the rotational position of the motion transfer member and thereby the rotational position of the associated damper shaft (8a, 8b) is controlled by the rotational position of the regulating member via this guiding (21).

13 Claims, 6 Drawing Sheets

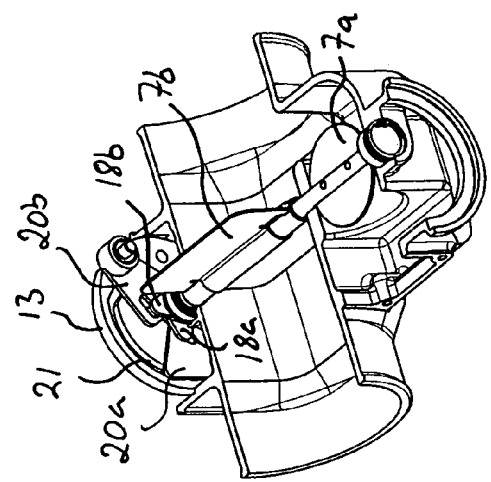
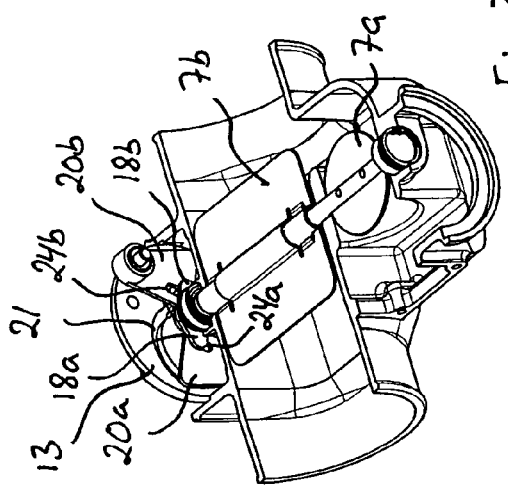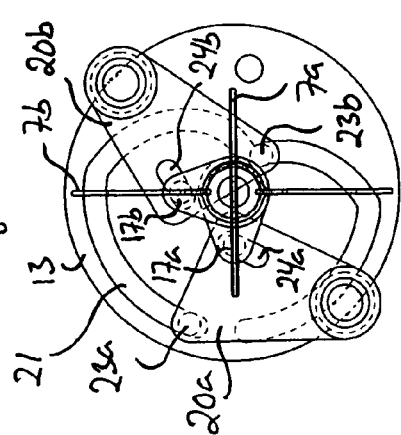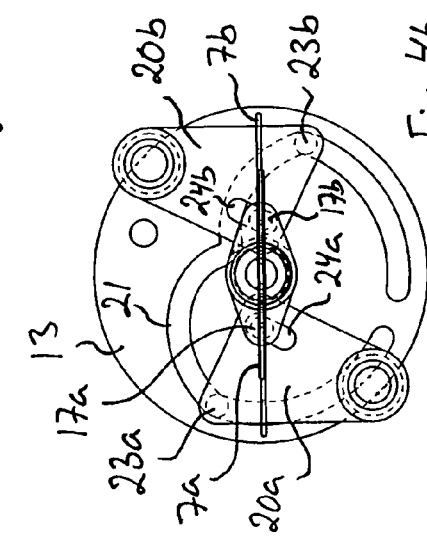
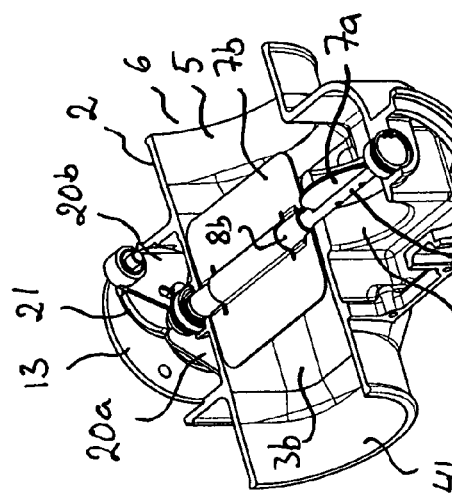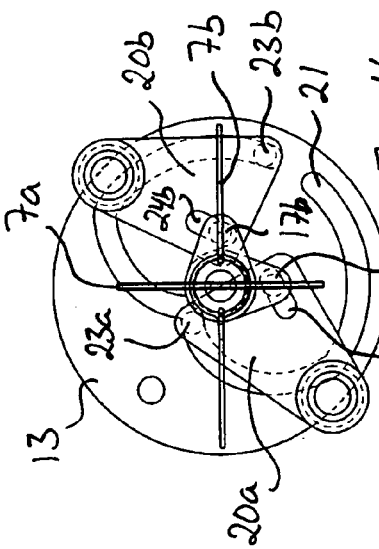

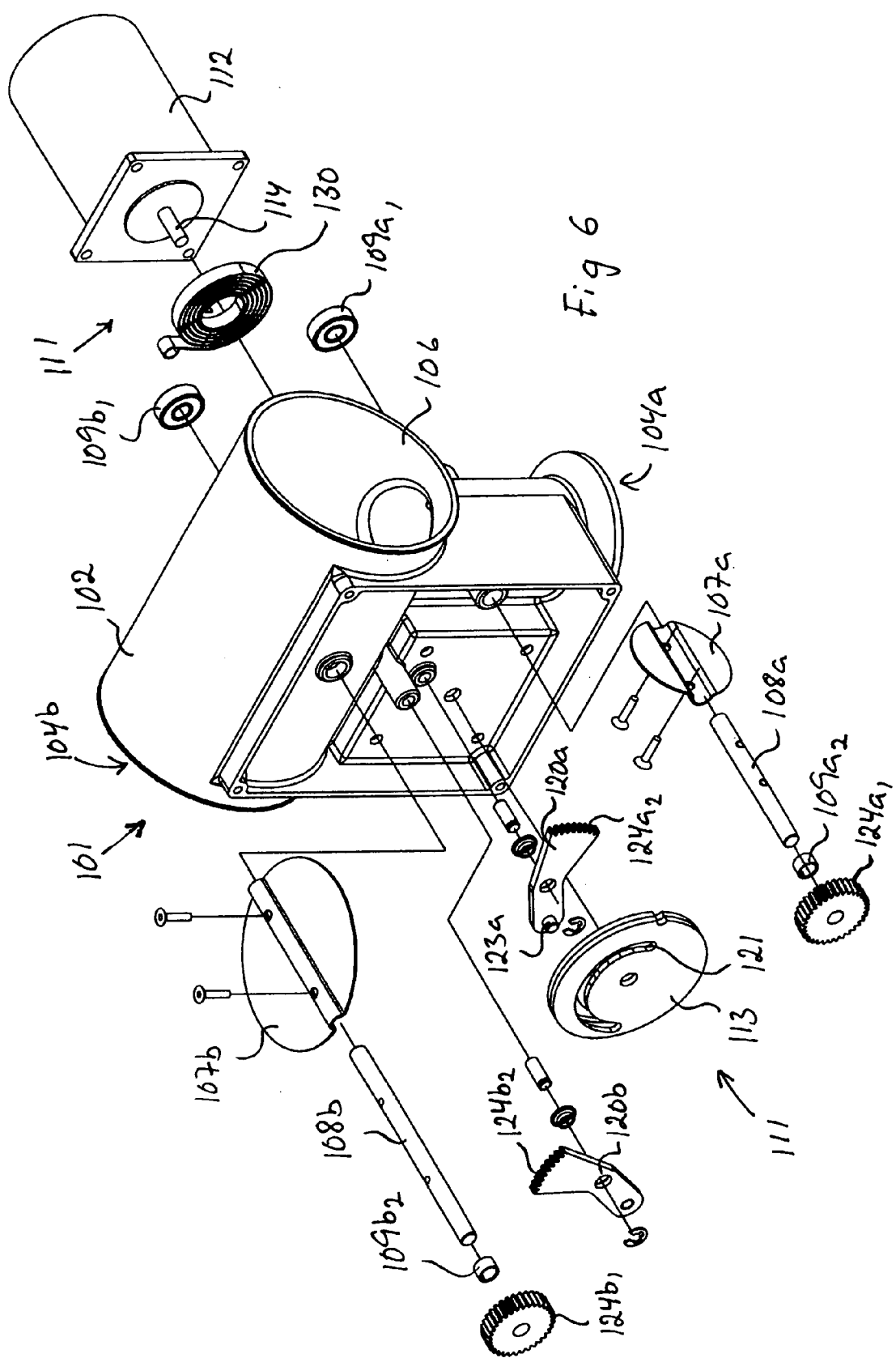

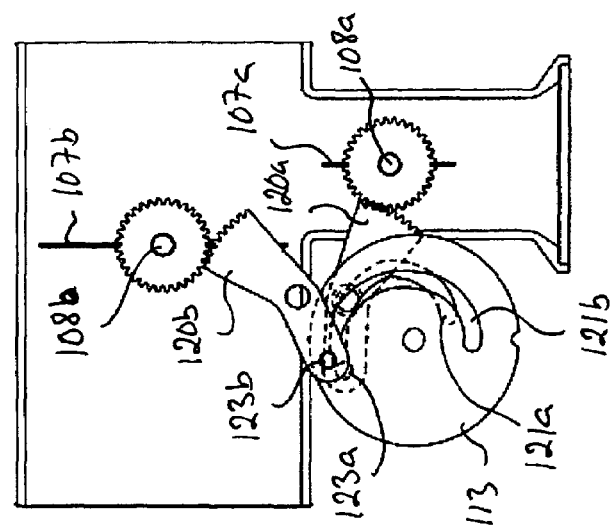
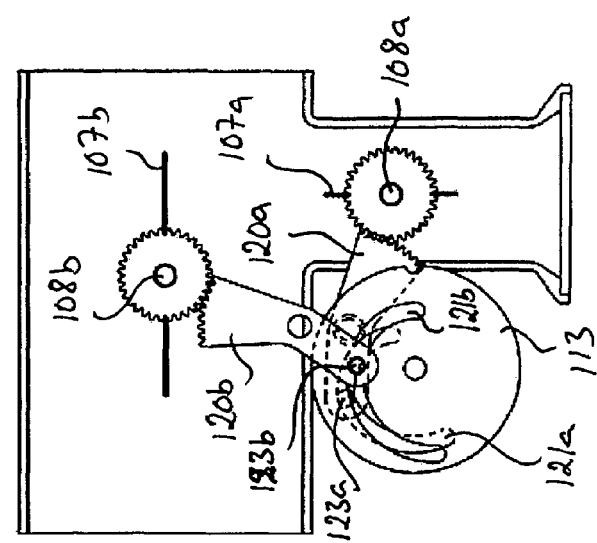
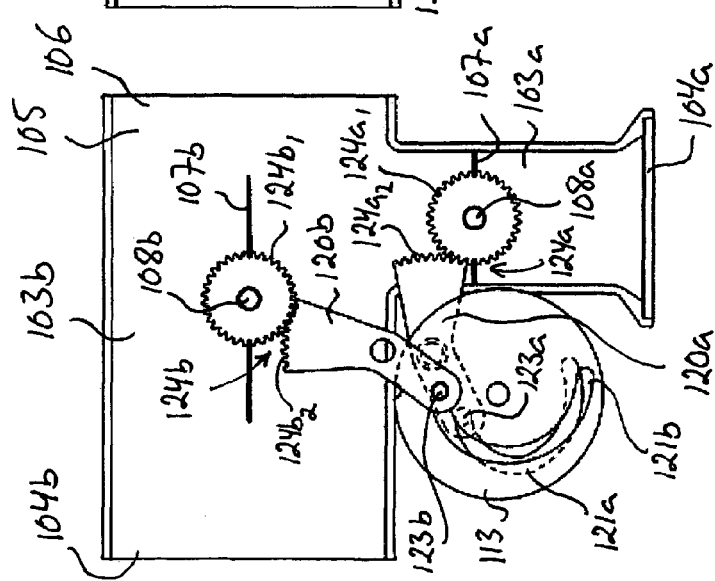

VALVE DEVICE

BACKGROUND OF THE INVENTION

Field of the Invention and Prior Art

The present invention relates to a valve device according to the description herein.

A valve device is previously known from the patent publication WO 00/28203 A1. This known valve device is intended to be included in an EGR system (EGR=Exhaust Gas Recirculation) of a combustion engine so as to regulate the relation between the amount of fresh air supplied to the combustion engine and the amount of recirculated exhaust gases supplied to the combustion engine from the recirculation conduit of the EGR system. This mixture adjusted by means of the valve device is supplied to the air intake of the engine. The valve device is in this case controlled by means of an EGR control device in dependence on inter alia the rotational speed and the load of the combustion engine. The valve device known from WO 00/28203 A1 comprises a first inlet channel intended to be connected to the recirculation conduit of the EGR system and a second inlet channel intended to be connected to the air intake channel of the combustion engine. These inlet channels are in the valve device brought together into a common outlet channel. A first damper, here denominated EGR damper, is arranged in the first inlet channel and a second damper, here denominated air damper, is arranged in the second inlet channel. The flow of recirculated exhaust gases and fresh air, respectively, in the inlet channels is regulated by means of these dampers. In the known valve device, the dampers are spring-loaded into an open position and a rotatable regulating member in the form of a regulating pin, which is common to the dampers and rotatable by an adjustment motor, is arranged to act on either damper for adjusting this damper between an open position and a closed position while the other damper is kept in an open position by said spring-loading. In this known valve device, the dampers are consequently individually adjustable independently of each other by means of a common adjustment motor, which enables an adequate control of the valve device using only one adjustment motor.

OBJECT OF THE INVENTION

The object of the present invention is to achieve a further development of the above-mentioned valve device so as to provide a function thereof improved in at least some aspect.

SUMMARY OF THE INVENTION

According to the invention, said object is achieved by means of a valve device having the features defined herein. In the valve device according to the present invention, the positions of the dampers are controlled by means of a regulating arrangement which inter alia comprises an actuator and a regulating member, which is rotatable relative to the valve housing and which is arranged to be rotated by the actuator. The regulating arrangement further comprises a first motion transfer member, which is rotatable relative to the regulating member and relative to the first damper shaft and is arranged to transfer a rotary motion of the regulating member into a rotary motion of the first damper shaft, and a second motion transfer member, which is rotatable relative to the regulating member and relative to the second damper shaft and is arranged to transfer a rotary motion of the regulating member into a rotary motion of the second damper shaft. The respective motion transfer member is in engagement with a guiding of the regulating member so that the rotational position of the motion transfer member and thereby the rotational position of the associated damper shaft is controlled by the rotational position of the regulating member via this guiding. With the inventive solution, the mutual rotary motions of the dampers of the valve device will depend on the design of the guiding of the regulating member and it will thereby be possible to give the valve device a desired opening characteristics by a suitable adaption of the design of the guiding. Furthermore, in the inventive valve device, the positions of the dampers are not controlled by spring forces, as in the valve device according to the above-mentioned WO00/28203 A1, which entails that the dampers obtain distinct positions which are not affected by the pressure from the fluid flowing against the dampers. Owing to the fact that the active regulation of the positions of the dampers by means of the actuator does not involve spring forces, it will furthermore be possible to achieve a more rapid adjustment of the positions of the dampers as compared to the valve device according to WO 00/28203 A1. and;

According to a preferred embodiment of the invention, the regulating member is by means of a spring member spring-loaded into a rotational position in which the regulating member is arranged to keep the first damper in a closed position and the second damper in an open position. Hereby, it is secured that the first damper will assume a closed position when the rotational force exerted on the regulating member by the actuator ceases, for instance due to a breakdown of the actuator or a loss of power supply to the actuator, which can be of advantage in certain applications. The valve device according to the invention is with advantage used as a so-called EGR valve in an EGR system in order to regulate, in the manner mentioned by way of introduction, the relation between the amount of fresh air supplied to the combustion engine from the inlet air channel of the combustion engine and the amount of recirculated exhaust gases supplied to the combustion engine from the recirculation conduit of the EGR system. In this usage, said first damper is intended to be arranged in the channel of the valve device that is connected to the recirculation conduit of the EGR system, i.e. the first damper will in this case constitute the EGR damper, whereas said second damper is intended to be arranged in the channel of the valve device that is connected to the air intake channel of the combustion engine, i.e. the second damper will in this case constitute the air damper. With the embodiment here in question, it is secured that the EGR damper will assume a closed position and the air damper an open position when the rotational force exerted on the regulating member by the actuator ceases, whereby recirculation of exhaust gases to the combustion engine is prevented and supply of inlet air to the combustion engine is secured when the valve device no longer can be controlled by means of the actuator. Hereby, undesirably high exhaust gas contents in the inlet air to the combustion engine is prevented, which otherwise might cause undesired deposit of soot in the combustion engine and in worst case damages to the combustion engine or damages to a particle filter arranged in the exhaust gas conduit from the combustion engine due to clogging thereof.

Further preferred embodiments of the inventive valve device will appear from the subsequent description.

Further preferred embodiments of the inventive valve device will appear from the subsequent description.

A closed position of a damper will in this description and the subsequent claims refer to a position in which the damper completely or at least essentially closes the associated flow channel so that fluid flow through the flow channel is prevented or at least essentially prevented. A closed position of a damper will consequently also embrace a position in which the damper does not completely close the flow channel and allows a smaller fluid flow through it. An open position of a damper will in this description and the subsequent claims refer to a position in which the damper does not counteract or at least only to a smaller extent counteracts fluid flow through the associated flow channel.

BRIEF DESCRIPTION OF THE DRAWINGS

The invention will in the following be more closely described by means of embodiment examples, with reference to the appended drawings. It is shown in.

DETAILED DESCRIPTION OF PREFERRED EMBODIMENTS

Figure 1:
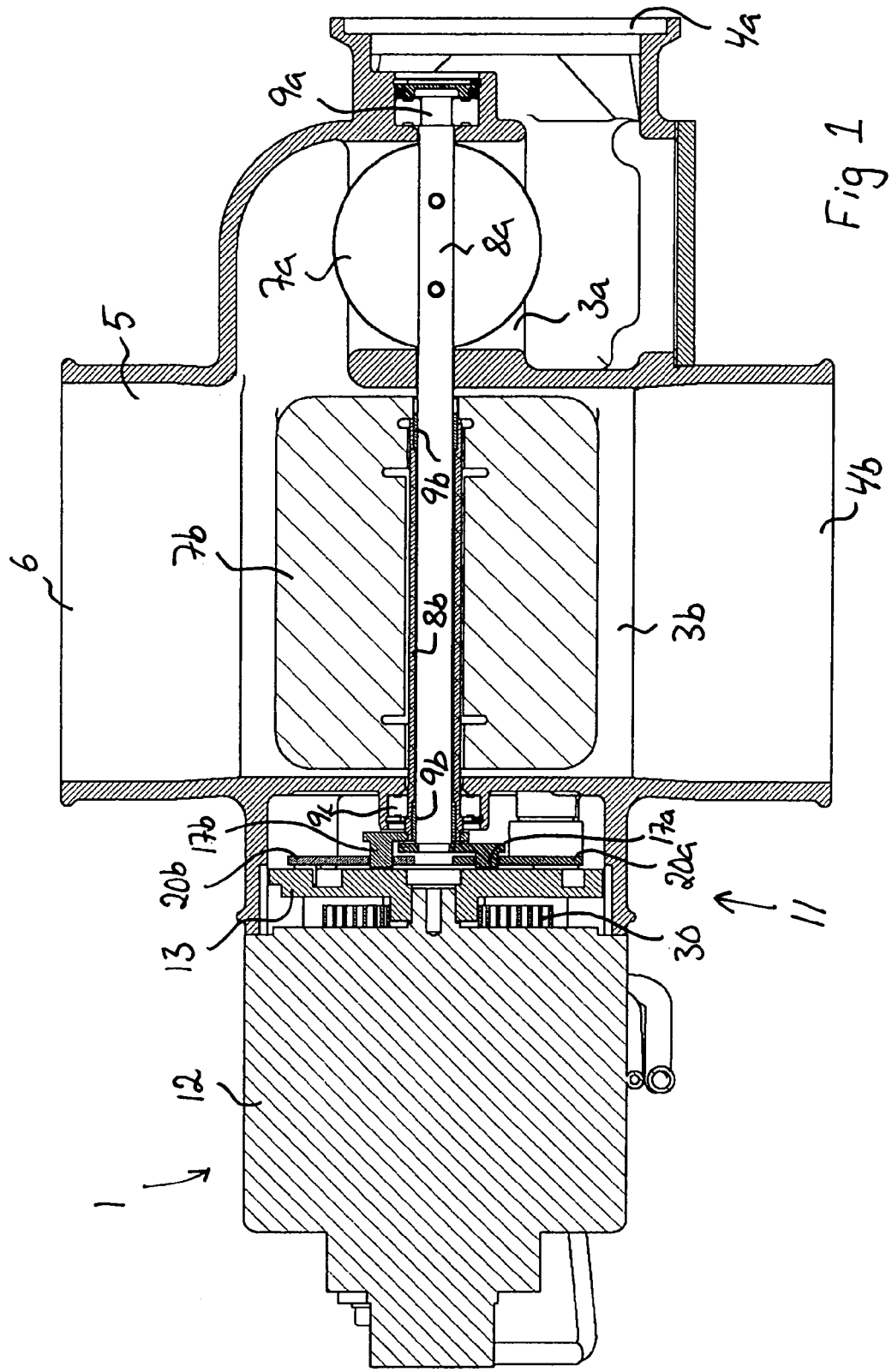
FIG. 1 a cut planar view of a valve device according to a first embodiment of the present invention, FIG. 2 an exploded view of the valve device according to FIG. 1, FIG. 3a-3c cut perspective views of the valve housing of the valve device according to FIG. 1 illustrating different adjustment positions of the dampers of the valve device, FIG. 4a-4c end views of the dampers of the valve device with associated motion transfer members and regulating member shown in the adjustment positions according to FIG. 3a-3c, FIG. 5 a perspective view of a valve device according to a second embodiment of the present invention, FIG. 6 an exploded view of the valve device according to FIG. 5, and FIG. 7a-7c schematical longitudinal sectional views of the valve device according to FIG. 5 illustrating different adjustment positions of the dampers of the valve device.
Figure 2:
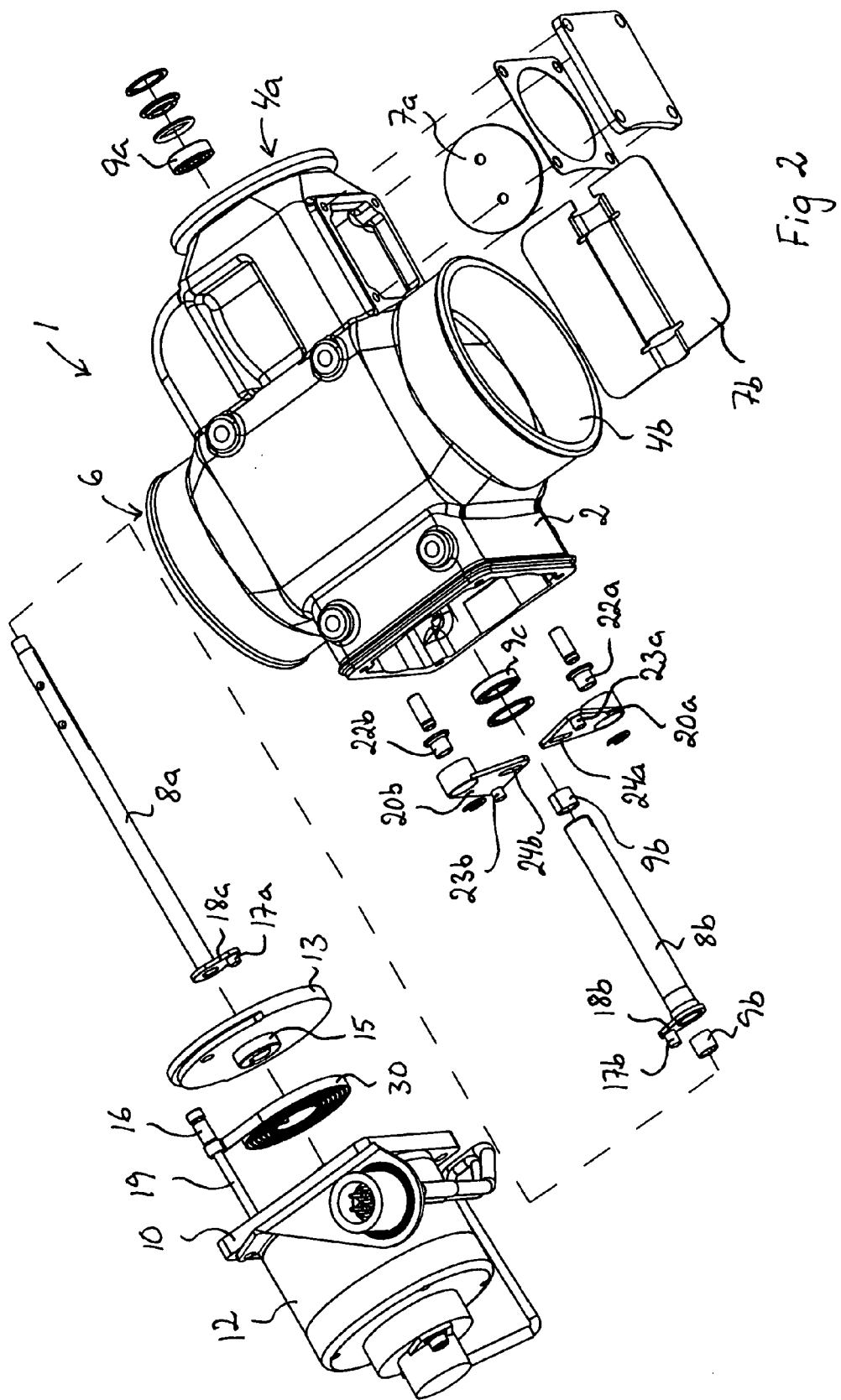

A valve device 1 according to a first embodiment of the present invention is illustrated in FIG. 1-4. This valve device 1 comprises a valve housing 2 with a first flow channel 3a and a second flow channel 3b. The first flow channel 3a is intended to receive a fluid entering the valve device via a first inlet opening 4a of the valve housing, and the second flow channel 3b is intended to receive a fluid entering the valve device via a second inlet opening 4b of the valve housing. The flow channels 3a, 3b are at their downstream ends connected to a common channel 5, which extends further on to an outlet opening 6 of the valve housing. Fluid entering the valve housing via the inlet openings 4a, 4b will consequently be brought together and mixed after the passage through the flow channels 3a, 3b so as to thereafter flow out of the valve housing via the outlet opening 6.

A first damper 7a, which is fixed to a first damper shaft 8a, is arranged in the first flow channel 3a, and a second damper 7b, which is fixed to a second damper shaft 8b, is arranged in the second flow channel 3b. The respective damper shaft 8a, 8b is rotatably mounted relative to the valve housing 2 and by rotation of the respective damper shaft 8a, 8b the associated damper 7a, 7b is rotated, whereby the fluid flow through the respective flow channel 3a, 3b can be regulated. The respective damper 7a, 7b is connected in a rotationally rigid manner to the associated damper shaft 8a, 8b. In the illustrated embodiment, the damper shafts 8a, 8b are mutually concentric and the dampers 7a, 7b are consequently rotatable about a common axis of rotation. The second damper shaft 8b is here tube-shaped and the first damper shaft 8a is arranged to extend through and inside the second damper shaft 8b. The first damper shaft 8a is via a first bearing 9a, preferably in the form of a ball bearing, rotatably mounted relative to the valve housing 2 and via one or several second bearings 9b, preferably in the form of slide bearings, rotatably mounted relative to the second damper shaft 8b. The second damper shaft 8b is in its turn via a third bearing 9c, preferably in the form of a ball bearing, rotatably mounted relative to the valve housing 2. Said first bearing 9a is here arranged at one end of the first damper shaft 8a and said third bearing 9c is arranged at the opposite end of the second damper shaft 8b.

The valve device comprises a regulating arrangement 11 for regulating the rotational position of the damper shafts 8a, 8b and thereby the rotational position of the dampers 7a, 7b. This regulating arrangement 11 comprises an actuator 12 and a regulating member 13, which is rotatable relative to the valve housing 2 and which is arranged to be rotated by the actuator 12. In the embodiment illustrated in FIG. 1-4, the regulating member 13 is disc-shaped and fixed to the outer end of the output shaft of the actuator. The actuator 12 is reversible so as to make possible a rotation of the regulating member 13 in the desired direction. The actuator 12 is suitably an electric motor, preferably in the form of a step motor.

The regulating arrangement 11 further comprises a first motion transfer member 20a, which is rotatable relative to the regulating member 13 and relative to the first damper shaft 8a and is arranged to transfer a rotary motion of the regulating member 13 into a rotary motion of the first damper shaft 8a, and a second motion transfer member 20b, which is rotatable relative to the regulating member 13 and relative to the second damper shaft 8b and is arranged to transfer a rotary motion of the regulating member 13 into a rotary motion of the second damper shaft 8b. The respective motion transfer member 20a, 20b is in engagement with a guiding 21 (see FIG. 3a-3c and FIG. 4a-4c) of the regulating member 13 so that the rotational position of the motion transfer member 20a, 20b and thereby the rotational position of the associated damper shaft 8a, 8b is controlled by the rotational position of the regulating member 13 via this guiding 21. The respective motion transfer member 20a, 20b is rotatably mounted in the valve housing 2, for instance via a slide bearing 22a, 22b, and has a swivelling axis extending in parallel with the longitudinal axis of the damper shafts 8a, 8b.

In the embodiment illustrated in FIG. 1-4, the guiding 21 of the regulating member consists of a guide track, which is arranged, for instance by milling, on the side of the regulating member 13 facing the dampers 7a, 7b. The respective motion transfer member 20a, 20b is provided with a protrusion 23a, 23b, for instance in the form of a pin, which is received in the guide track 21 of the regulating member. In the illustrated embodiment, the guiding of the regulating member consists of a continuous guide track 21, in which the protrusions 23a, 23b of both motion transfer members engage. The guiding 21 could of course also consist of two separate guide tracks, each of which receiving a respective one of said protrusions 23a, 23b. In the last-mentioned case, it also possible to arrange the two guide tracks on opposite sides of the regulating member.

In the embodiment illustrated in FIG. 1-4, the motion transfer between the motion transfer members 20a, 20b and the damper shafts 8a, 8b is carried out by means of guidings 24a, 24b of the motions transfer members. The rotational position of the first damper shaft 8a is controlled by the rotational position of the first motion transfer member 20a via a guiding 24a of the first motion transfer member, and the rotational position of the second damper shaft 8b is controlled by the rotational position of the second motion transfer member 20b via a guiding 24b of the second motion transfer member. The guiding 24a, 24b of the respective motion transfer member here consists of a guide track. The first damper shaft 8a is connected in a rotationally rigid manner to a protrusion 17a, for instance in the form of a pin, which is received in the guide track 24a of the first motion transfer member, and the second damper shaft 8b is connected in a rotationally rigid manner to a protrusion 17b, for instance in the form of a pin, which is received in the guide track 24b of the second motion transfer member. The protrusion 17a, 17b of the respective damper shaft is suitably fixed to the damper shaft via a holding member 18a, 18b, which is connected in a rotationally rigid manner to the damper shaft and protrudes in radial direction therefrom.

The regulating member 13 is suitably, by means of a spring member 30, spring-loaded into a rotational position in which the regulating member 13 is arranged to keep the first damper 7a in a closed position and the second damper 7b in an open position. When the regulating member 13 is no longer controlled by the actuator 12, the spring member 30 will force the regulating member 13 to assume the position illustrated in FIGS. 3a and 4a and retain the regulating member in this position, whereby the regulating member 13 via the motion transfer members 20a, 20b will force the first damper 7a to assume a closed position and the second damper 7b to assume an open position and retain them in these positions. By means of the spring member 30, the valve device 1 is consequently made to assume the end position illustrated in FIGS. 3a and 4a when the actuator 12 is switched off or put out of operation in another manner and thereby no longer exerts any force on the damper shafts via the regulating member 13 and the motion transfer members 20a, 20b. In the embodiment illustrated in FIG. 1-4, the spring member 30 is arranged about the output shaft of the actuator, the spring member 30 at one of its ends being connected in a rotationally rigid manner to the output shaft of the actuator and at its other end being connected in a rotationally rigid manner to the valve housing 2. The spring member 30 is suitably a torsion spring in the form of a flat coil spring. In the illustrated embodiment, the inner end of the spring member is fixed in a recess formed in a collar-shaped part 15 of the regulating member 13 and its outer end is fixed in a spacing sleeve 16, which via a screw 19 is fixed to an end plate 10 of the actuator's motor housing.

According to an alternative, not illustrated embodiment, the actuator 12 has a through shaft extending through the entire motor housing and protruding also on the side of the actuator's motor housing facing away from the damper shafts. In this case, the spring member 30 may as an alternative to the location illustrated in FIGS. 1 and 2 be located on the side of the actuator's motor housing facing away from the damper shafts, for instance by being arranged about the part of the output shaft of the actuator protruding on this side of the actuator's motor housing.

In the embodiment here illustrated, the guiding 21 of the regulating member has such a design that the first damper 7a will assume a closed position and the second damper an open position when the regulating member 13 is in a first end position. This first end position is illustrated in FIGS. 3a and 4a. From this first end position, the regulating member is by rotation clockwise in FIGS. 3a and 4b rotatable to the intermediate position illustrated in FIGS. 3b and 4b. In this intermediate position, both dampers 7a, 7b assume an open position. By a rotation of the regulating member 13 in a desired direction between the first end position and the intermediate position, the first damper 7a is consequently made to assume a desired position between closed and open position, while the second damper remains in open position. From the intermediate position, the regulating member is by a continued rotation clockwise in FIGS. 3b and 4b rotatable to the second end position illustrated in FIGS. 3c and 4c. In this second end position, the first damper assumes an open position and the second damper 7b a closed position. By a rotation of the regulating member 13 in the desired direction between the second end position and the intermediate position, the second damper 7b is consequently made to assume a desired position between closed and open position, while the first damper remains in open position. In this case, the valve device 1 is consequently so designed that at least one of the dampers 7a, 7b always is kept open at the same time as either damper 7a, 7b by means of the common actuator 12 is adjustable into a desired position between open position and closed position. This valve device 1 will consequently make possible a mixing of two inflowing fluids in such a manner that the fluid flow through one flow channel 3a, 3b at a time can be regulated from maximum to zero while the fluid flow through the other flow channel 3b, 3a is set to maximum. The invention is of course not limited to this embodiment of the guiding 21 of the regulating member. It is realised that the mutual positions of the dampers may be controlled in another manner than here shown by giving the guiding 21 of the regulating member another design than illustrated in FIG. 3a-3c and 4a-4c.

Figure 5:
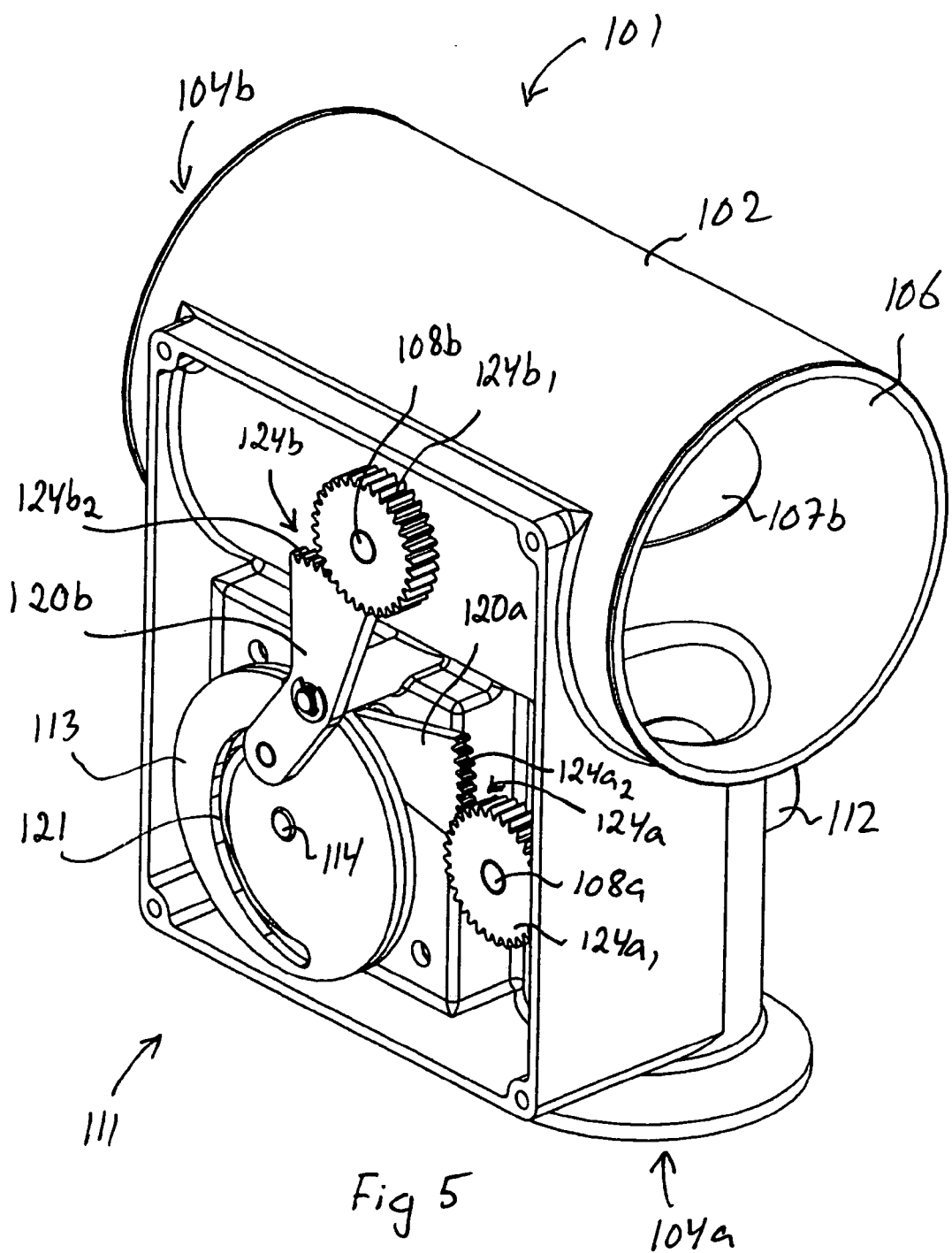

A valve device 101 according to a second embodiment of the present invention is illustrated in FIG. 5-7. This valve device 101 comprises a valve housing 103 with a first flow channel 103a and a second flow channel 103b. The first flow channel 103a is intended to receive a fluid entering the valve device via a first inlet opening 104a of the valve housing, and the second flow channel 103b is intended to receive a fluid entering the valve device via a second inlet opening 104b of the valve housing. The flow channels 103a, 103b are at their downstream ends connected to a common channel 105, which extends further on to an outlet opening 106 of the valve housing. Fluid entering the valve housing via the inlet openings 104a, 104b will consequently be brought together and mixed after the passage through the flow channels 103a, 103b so as to thereafter flow out of the valve housing via the outlet opening 106.

A first damper 107a, which is fixed to a first damper shaft 108a, is arranged in the first flow channel 103a, and a second damper 107b, which is fixed to a second damper shaft 108b, is arranged in the second flow channel 103b. The respective damper shaft 108a, 108b is rotatably mounted relative to the valve housing 102 and by a rotation of the respective damper shaft 108a, 108b the associated damper 107a, 107b is rotated, whereby the fluid flow through the respective flow channel 103a, 103b can be regulated. The respective damper 107a, 107b is connected in a rotationally rigid manner to the associated damper shaft 108a, 108b. In the illustrated embodiment, the damper shafts 108a, 108b are arranged in parallel with each other and at a distance from each other, and the dampers 107a, 107b are consequently rotatable about parallel axis of rotation located at a distance from each other. The respective damper shaft 108a, 108b is via two bearings $109a_1$, $109a_2$ and $109b_1$, $109b_2$, respectively, rotatably mounted relative to the valve housing 102.

The valve device comprises a regulating arrangement 111 for regulating the rotational position of the damper shafts 108a, 108b and thereby the rotational position of the dampers 107a, 107b. This regulating arrangement 111 comprises an actuator 112 and a regulating member 113, which is rotatable relative to the valve housing 102 and which is arranged to be rotated by the actuator 112. In the embodiment illustrated in FIG. 5-7, the regulating member 113 is disc-shaped and fixed to the output shaft 114 of the actuator. The actuator 112 is reversible so as to make possible a rotation of the regulating member 113 in the desired direction. The actuator 112 is suitably an electric motor, preferably in the form of a step motor.

The regulating arrangement 111 further comprises a first motion transfer member 120a, which is rotatable relative to the regulating member 113 and relative to the first damper shaft 108a and is arranged to transfer a rotary motion of the regulating member 113 into a rotary motion of the first damper shaft 108a, and a second motion transfer member 120b, which is rotatable relative to the regulating member 113 and relative to the second damper shaft 108b and is arranged to transfer a rotary motion of the regulating member 113 into a rotary motion of the second damper shaft 108b. The respective motion transfer member 120a, 120b is in engagement with a guiding 121 of the regulating member 113 so that the rotational position of the rotary transfer member 120a, 120b and thereby the rotational position of the associated damper shaft 108a, 108b is controlled by the rotational position of the regulating member 113 via this guiding 121. The respective motion transfer member 120a, 120b is rotatably mounted in the valve housing 102 and has a swivelling axis extending in parallel with the longitudinal axes of the damper shafts 108a, 108b.

In the embodiment illustrated in FIG. 5-7, the guiding 121 of the regulating member consists of two guide tracks 121a, 121b, which are here arranged, for instance by milling, on opposite sides of the regulating member 113. The motion transfer members 120a, 120b are provided with a respective protrusion 123a, 123b, for instance in the form of a pin, which are received in a respective one of the guide tracks 121a, 121b of the regulating member. The two guide tracks could also be arranged on one and the same side of the regulating member. The guiding 121 could of course also consist of one single continuous guide track, which receives the protrusions 123a, 123b of both motion transfer members.

In the embodiments illustrated in FIG. 5-7, the motion transfer between the motion transfer members 120a, 120b and the damper shafts 108a, 108b is carried out by means of tooth mechanisms 124a, 124b. The first damper shaft 108a is in engagement with the first motion transfer member 120a via a first tooth mechanism 124a so that the rotational position of the first damper shaft 108a is controlled by the rotational position of the first motion transfer member 120a via this first tooth mechanism. The second damper shaft 108b is in engagement with the second motion transfer member 120b via a second tooth mechanism 124b so that the rotational position of the second damper shaft 108b is controlled by the rotational position of the second motion transfer member 120b via this second tooth mechanism.

The first tooth mechanism 124a comprises a tooth member $124a_1$ at the first damper shaft 108a, and a tooth member $124a_2$ at the first motion transfer member 120a. The second tooth mechanism 124b comprises a tooth member $124b_1$ at the second damper shaft 108b, and a tooth member $124b_2$ at the second motion transfer member 120b. In the respective tooth mechanism, the tooth member $124a_1$, $124b_1$ of the damper shaft is in engagement with the corresponding tooth member $124a_2$, $124b_2$ of the associated motion transfer member. The tooth member $124a_1$, $124b_1$ of the respective damper shaft is suitably a toothed wheel, which is fixed in a rotationally rigid manner to the damper shaft so that the damper shaft can be rotated by rotation of the toothed wheel. The respective motion transfer member 120a, 120b has its protrusion 123a, 123b and its tooth member $124a_2$, $124b_2$ arranged on opposite sides of the swivelling axis of the motion transfer member. The tooth mechanisms may of course have another design than illustrated in FIG. 5-7.

The regulating member 113 is suitably by means of a spring member 130 spring-loaded into a rotational position in which the regulating member 113 is arranged to keep the first damper 107a in a closed position and the second damper in an open position. When the regulating member 113 is no longer controlled by the actuator 112, the spring member 130 will force the regulating member 113 to assume the position illustrated in FIG. 7a and retain the regulating member in this position, whereby the regulating member 113 via the motion transfer members 120a, 120b will force the first damper 107a to assume a closed position and the second damper 107b to assume an open position and retain them in these positions. By means of the spring member 30, the valve device 101 is consequently made to assume the end position illustrated in FIG. 7a when the actuator 112 is switched off or put out of operation in another manner and thereby no longer exerts any force on the damper shafts via the regulating member 113 and the motion transfer members 120a, 120b. In the embodiment illustrated in FIG. 5-7, the spring member 130 is arranged about the output shaft 114 of the actuator, the spring member 130 being at one of its ends connected in a rotationally rigid manner to the output shaft 114 of the actuator and being at its other end connected in a rotationally rigid manner to the valve housing 102. The spring member 130 is suitably a torsion spring in the form of a flat coil spring.

According to an alternative, not illustrated embodiment, the actuator 112 has a through shaft extending through the entire motor housing and protruding also on the side of the actuator's motor housing facing away from the damper shafts. In this case, the spring member 130 may as an alternative to the location illustrated in FIGS. 5 and 6 be located on the side of the actuator's motor housing facing away from the damper shafts, for instance by being arranged about the part of the actuator's output shaft that protrudes on this side of the actuator's motor housing.

In the embodiment illustrated in FIG. 5-7, the guiding 121 of the regulating member has such a design that the first damper 107a will assume a closed position and the second damper 107b an open position when the regulating member 113 is in a first end position. This first end position is illustrated in FIG. 7a. From this end position, the regulating member is by rotation clockwise in FIG. 7a rotatable to the intermediate position illustrated in FIG. 7b. In this intermediate position, both dampers 107a, 107b assume an open position. By a rotation of the regulating member 113 in the desired direction between the first end position and the intermediate position, the first damper 107a is consequently made to assume a desired position between closed and open position, while the second damper 107b remains in open position. From the intermediate position, the regulating member 113 is by continued rotation clockwise in FIG. 7b rotatable to the second end position illustrated in FIG. 7c. In this second end position, the first damper 107a assumes an open position and the second damper 107b a closed position. By a rotation of the regulating member 113 in the desired direction between the second end position and the intermediate position, the second damper 107b is consequently made to assume a desired position between closed and open position, while the first damper 107a remains in open position. In this case, the valve device 101 is consequently so designed that at least one of the dampers 107a, 107b always is kept open at the same time as either damper 107a, 107b by means of the common actuator 112 is adjustable into a desired position between open position and closed position. This valve device 101 will consequently make possible a mixing of two inflowing fluids in such a manner that the fluid flow through one flow channel 103a, 103b at a time can be regulated from maximum to zero while the fluid flow in the other flow channel 103b, 103a is set to maximum. The invention is of course not limited to this design of the guiding 121 of the regulating member. It is realised that the mutual positions of the dampers may be controlled in another manner than here shown by giving the guiding 121 of the regulating member another design than illustrated in FIG. 7.

A valve device provided with concentric damper shafts according to the embodiment of FIG. 1-4 could be provided with a regulating arrangement of the type illustrated in FIG. 5-7, i.e. a regulating arrangement where the motion transfer between the motion transfer members and the damper shafts is carried out by means of tooth mechanisms. In the corresponding manner, a valve device provided with damper shafts arranged at a distance from each other in accordance with the embodiment of FIG. 5-7 could be provided with a regulating arrangement of the type illustrated in FIG. 1-4, i.e. a regulating arrangement where the motion transfer between the motion transfer members and the damper shafts is carried out by means of guidings in the motion transfer members.

The inventive valve device 1, 101 is with advantage a so-called EGR valve, which is intended to be included in an EGR system of a combustion engine in order to regulate the relation between the amount of fresh air supplied to the combustion engine from the inlet air channel of the combustion engine and the amount of recirculated exhaust gases supplied to the combustion engine from the recirculation conduit of the EGR system. The mixture adjusted by means of the valve device 1, 101 is supplied to the air intake of the engine. The valve device 1, 101 is in this case controlled by means of an EGR control device in dependence on inter alia the rotational speed and the load of the combustion engine. In this usage, the first flow channel 3a, 103a is intended to be connected to the recirculation conduit of the EGR system, and the second flow channel 3b, 103b is intended to be connected to the air inlet channel of the combustion engine, the first damper 7a, 107a consequently constituting the EGR damper of the EGR valve and the second damper 7b, 107b constituting the air damper of the EGR valve. A valve device according to the invention can of course also be used in other applications where the fluid flow through two flow channels are to be regulated.

The invention is of course not in any way limited to the preferred embodiments described above. On the contrary, many possibilities to modifications thereof should be apparent to a person skilled in the art without departing from the basic idea of the invention as defined in the appended claims.

The invention claimed is:

1. A valve device comprising:
   a valve housing with a first flow channel and a second flow channel;
   a first damper shaft, which is rotatable relative to the valve housing;
   a first damper, which is arranged in the first flow channel and is fixed to the first damper shaft;
   a second damper shaft, which is rotatable relative to the valve housing;
   a second damper, which is arranged in the second flow channel and is fixed to the second damper shaft; and
   a regulating arrangement for regulating the rotational position of said damper shafts and thereby the rotational position of said dampers, which regulating arrangement comprises an actuator and a regulating member, which is rotatable relative to the valve housing and which is arranged to be rotated by the actuator,
   wherein
   the regulating arrangement further comprises:
   a first motion transfer member, which is rotatable relative to the regulating member and relative to the first damper shaft and is arranged to transfer a rotary motion of the regulating member into a rotary motion of the first damper shaft;
   a second motion transfer member, which is rotatable relative to the regulating member and relative to the second damper shaft and is arranged to transfer a rotary motion of the regulating member into a rotary motion of the second damper shaft,
   the respective motion transfer member being in engagement with a guiding of the regulating member so that the rotational position of the motion transfer member and thereby the rotational position of the associated damper shaft is controlled by the rotational position of the regulating member via this guiding, and
   said guiding comprises one or several guide tracks, the respective motion transfer member being provided with a protrusion received in the associated guide track of the regulating member.

2. A valve device according to claim 1, wherein the protrusion of the first motion transfer member is received in a first guide track arranged on a first side of the regulating member, and the protrusion of the second motion transfer member is received in a second guide track arranged on the opposite side of the regulating member.

3. A valve device according to claim 1, wherein the protrusion of the first motion transfer member and the protrusion of the second motion transfer member engage in the respective guide track of the regulating member on one and the same side of the regulating member.

4. A valve device according to claim 1, wherein
   the first motion transfer member is provided with a guiding, the rotational position of the first damper shaft being controlled by the rotational position of the first motion transfer member via the guiding of the first motion transfer member; and
   the second motion transfer member is provided with a guiding, the rotational position of the second damper shaft being controlled by the rotational position of the second motion transfer member via the guiding of the second motion transfer member.

5. A valve device according to claim 4, wherein the guiding of the respective motion transfer member is a guide track, the first damper shaft being connected in a rotationally rigid manner to a protrusion received in the guide track of the first motion transfer member, and the second damper shaft being connected in a rotationally rigid manner to a protrusion received in the guide track of the second motion transfer member.

6. A valve device according to claim 1, wherein
   the first damper shaft is in engagement with the first motion transfer member via a first tooth mechanism so that the rotational position of the first damper shaft is controlled by the rotational position of the first motion transfer member via the first tooth mechanism; and the second damper shaft is in engagement with the second motion transfer member via a second tooth mechanism so that the rotational position of the second damper shaft is controlled by the rotational position of the second motion transfer member via the second tooth mechanism.

7. A valve device according to claim 6, wherein the first tooth mechanism comprises a tooth member at the first damper shaft and a tooth member at the first motion transfer member, which tooth members are in engagement with each other; and the second tooth mechanism comprises a tooth member at the second damper shaft and a tooth member at the second motion transfer member, which tooth members are in engagement with each other.

8. A valve device according to claim 1, wherein the first damper shaft and the second damper shaft are mutually concentric.

9. A valve device according to claim 8, wherein one damper shaft extends through the other damper shaft.

10. A valve device according to claim 1, wherein the regulating member by means of a spring member is spring-loaded into a rotational position in which the regulating member is arranged to keep the first damper in a closed position and the second damper in an open position.

11. A valve device according to claim 1, wherein the regulating member is connected in a rotationally rigid manner to an output shaft of the actuator.

12. A valve device according to claim 1, wherein the regulating member is disc-shaped.

13. A valve device according to claim 1, wherein the actuator is an electric motor, preferably in the form of a step motor.

* * * * *